Oct. 10, 1967  R. S. ALWITT ET AL  3,346,782
ELECTROLYTIC CAPACITOR
Filed July 1, 1964
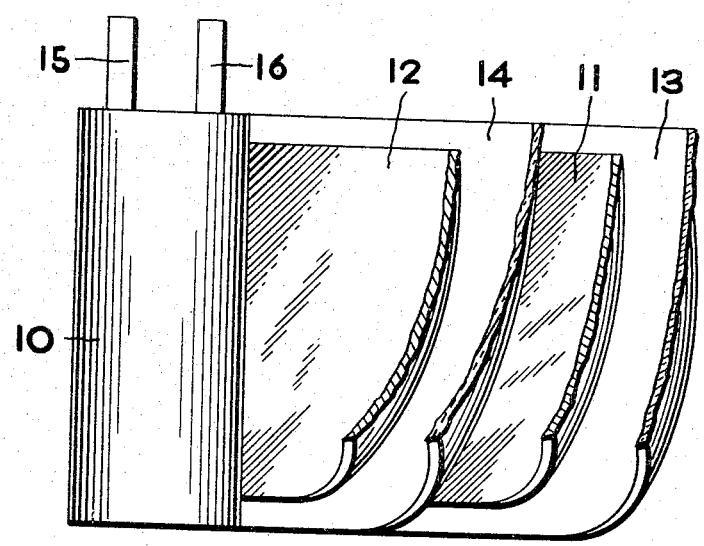
ROBERT S. ALWITT
SIDNEY D. ROSS
INVENTORS
BY
*Connolly and Hutz*
THEIR ATTORNEYS 3,346,782
ELECTROLYTIC CAPACITOR
Robert S. Alwitt, North Adams, and Sidney D. Ross, Williamstown, Mass., assignors to Sprague Electric Company, North Adams, Mass., a corporation of Massachusetts
Filed July 1, 1964, Ser. No. 379,538
3 Claims. (Cl. 317—230)

ABSTRACT OF THE DISCLOSURE

An electrolytic capacitor having an electrolyte of a nonaqueous solvent and a salt of the general formula $R_1COONH_2R_2R_3$, wherein $R_1$, $R_2$ and $R_3$ are hydrogen and/or alkyl groups. The electrolyte also contains sufficient amide derivative of said salt and sufficient water to maintain the equilibrium of the system.

---

The present invention is concerned with an electrolytic capacitor and more particularly with a capacitor utilizing a new electrolyte and a method of forming said electrolyte.

It has been observed that capacitor electrolytes of the type—nonaqueous solvent+an ammonium aliphatic carboxylate or hydroxy carboxylate—increase in resistivity to an intolerable level upon heating for periods of time at the maximum operating temperature. Investigation has revealed that this is due to decomposition of the ammonium carboxylate to the amide and water. As the amide is formed, the concentration of $RCOO^-$ and $NH_4^+$ decreases and the resistivity increases. The disadvantages of this unstable system are obvious.

It is an object of the invention to present an electrolytic capacitor utilizing a comparatively stable, low resistivity electrolyte.

Another object of the invention is to present a capacitor employing an electrolyte not subject to the above-mentioned prior art disadvantage.

These and other objects and advantages of the present invention will be made obvious to those skilled in the art by the following description when considered in relation to the accompanying drawing, of which:

The sole figure shows a side view of a capacitance section, partially unwound.

The objects of the present invention are attained by providing an electrolytic capacitor comprising electrodes separated from one another by an inert spacer, which is impregnated with an electrolyte comprising a nonaqueous solvent having dissolved therein a compound of the general formula $R_1COONH_2R_2R_3$, wherein $R_1$, $R_2$ and $R_3$ are selected from the group consisting of hydrogen, a straight, branched, substituted, unsubstituted, saturated and unsaturated $C_1$–$C_7$ alkyl group and mixtures thereof. This compound is the ionogen of the electrolytes. The essence of the invention resides in controlling the concentration of the ionogen in such a manner that it will not decrease during preparation of the electrolyte, during use of the capacitor or during the shelf-life of the capacitor. This is accomplished by preventing or reversing the following reaction:

$$R_1COONH_2R_2R_3 \rightarrow R_1CONR_2R_3 + H_2O$$

This reaction is effectively prevented or reversed by providing the electrolyte with sufficient added amide and added water by weight to maintain equilibrium or shift the reaction to the left over an extended temperature range.

Specific ionogens within the above general formula are ammonium formate, ammonium acetate, ammonium lactate, dimethylammonium formate, bis(2-hydroxyethyl) ammonium acetate, ammonium acrylate, ammonium butyrate, etc. The corresponding amide derivatives of these salts, e.g., formamide, acetamide, lactamide, etc., along with water constitute the other principal constituents of the electrolyte. The nonaqueous solvents contemplated include ethylene glycol, tributyl phosphate, the monoalkyl ethers of diethylene glycols, ether alcohols, dimethylformamide, etc.

Reference is made to the drawing herein, in which capacitance section 10 is shown in partly unrolled condition. Anode 11 of section 10 is of a so-called "valve-metal" (e.g., tantalum, aluminum, etc.) having on its surface an insulating oxide layer. Cathode 12 may also be made of a "valve-metal" or of a noble metal. Also separating the anode and cathode are porous spacers 13 and 14 which may be glass cloth, cellulose paper, perforated Teflon or other material inert in the electrochemical system. The porous spacers are impregnated with the electrolyte of the present invention.

The invention will be exemplified by the use of an electrolyte consisting essentially of ammonium formate as the ionogen, formamide and water as the equilibrium-controlling constituents and ethylene glycol as the solvent.

EXAMPLE I

| | Gms. |
|---|---|
| Ethylene glycol | 96.0 |
| Ammonium formate $HCOONH_4$ (0.63 M) | 4.0 |
| Formamide $HCONH_2$ (2.2 M) | 10.0 |
| Water (Karl Fisher method) (0.56 M) | 1.0 |

Table 1

| Time: | Resistivity, ohm-cm. |
|---|---|
| Less than 1 hour | 236 |
| After 21 hours at 85° C. | 232 |
| After 110 hours at 85° C. | 248 |

As can be seen, the resistivity remained essentially unchanged.

EXAMPLE II

The following is an example of the same electrolyte but without the amide.

| | Gms. |
|---|---|
| Ethylene glycol | 96.0 |
| Ammonium formate | 4.0 |
| Water (Karl Fisher method) | 1.0 |

Table 2

| Time: | Resistivity, ohm-cm. |
|---|---|
| Less than 1 hour | 256 |
| After 17 hours at 85° C. | 392 |
| After 127 hours at 85° C. | 444 |

From the considerable resistivity change shown in Table 2, it is clear that this is an unstable and, therefore, unsatisfactory electrolyte. By contrast, the efficacy of the amide and water to stabilize the resistivity of the same electrolyte is obvious from the data of Example I.

The relative proportions of the amide and water will vary depending upon: the resistivity desired; the temperature range of operation or storage of the capacitor or electrolyte; the ammonium salt employed as the ionogen and the particular nonaqueous solvent selected. The resistivity of the electrolyte is decided upon by the capacitor manufacturer by taking into consideration various factors, such as: the service to which the capacitor is to be put, size of the unit, etc. Once the resistivity is decided upon, a solvent and an ammonium salt or substituted ammonium salt of the type disclosed, in an amount sufficient to give the selected resistivity, are carefully combined.

By knowing the salt concentration which gives the desired resistivity and by determining the equilibrium constant, $$K = \frac{[\text{amide}][\text{H}_2\text{O}]}{[\text{salt}]^2}$$

it follows that for a given salt concentration at equilibrium:

$$K[\text{salt}]^2 = [\text{amide}][\text{H}_2\text{O}]$$

so that to keep the salt concentration constant the concentrations of the amide and water must be adjusted so that the product:

$$[\text{amide}][\text{H}_2\text{O}] = K[\text{salt}]^2$$

Thus, in Example I, wherein K is 2.65 at 80.7° C., it will be seen that actually a slight excess of amide was present, insuring an equilibrium system or theoretically a slight reverse reaction. Another way of stating the proportion of amide necessary to overcome the prior art disadvantage is that the amide and water constituents should be added in amounts sufficient to inhibit the decomposition of the ammonium salt.

It is to be understood that the term "added water" refers not only to water added to an anhydrous solution of solvent, salt and amide but also to absorbed water, which the system picks up during production of the electrolyte and capacitors containing the same. The added water may range from 0.1 to about 5% by weight. An added advantage of the present invention is the more or less inherent control, in the system, of water, too much of which increases the probability of corrosion. If the water content increases beyond that necessary for equilibrium, it will react with and hydrolyze some of the amide and thereby be consumed.

The housing for the capacitor may consist of a metal or non-metal container such as aluminum or silver and glass, respectively. Conventional sealing means may be employed, the exact nature depending upon the temperature range to be encountered, the viscosity of the electrolyte, etc. In addition to the rolled capacitor illustrated, the invention is applicable to sintered porous anodes, rod and wire anodes, etc.

As is evident from the foregoing, the invention is not to be limited to formation of the rather specific illustrative device. Modifications and variations, as well as the substitutions of equivalents may be made without departing from the spirit of the invention as defined in the appended claims.

What is claimed is:
1. An electrolytic capacitor comprising electrodes separated from one another by an inert spacer impregnated with an electrolyte consisting essentially of a nonaqueous solvent containing a substantially constant concentration of an ammonium salt of the formula $R_1\text{COONH}_2R_2R_3$ wherein $R_1$, $R_2$ and $R_3$ are selected from the group consisting of hydrogen, a straight, branched, substituted, unsubstituted, saturated and unsaturated $C_1$–$C_7$ alkyl group and mixtures thereof; said solvent also containing the amide derivative of said ammonium salt and from about 0.1 to about 5% of added water; the concentrations of the amide and water being related to the concentration of the salt in accordance with the equation:

$$[\text{amide}][\text{H}_2\text{O}] = K[\text{salt}]^2$$

wherein K is the equilibrium constant.

2. An electrolytic capacitor comprising electrodes separated from one another by an inert spacer which is impregnated with an electrolyte consisting essentially of ethylene glycol containing a substantially constant concentration of ammonium formate, formamide and from about 0.1 to about 5% of added water; the concentrations of the formamide and water being related to the concentration of the ammonium formate in accordance with the equation: [formamide][water] = 2.65[ammonium formate]$^2$.

3. The method of stabilizing the resistivity of an electrolyte consisting essentially of a nonaqueous solvent and a substantially constant concentration of an ionogen of the formula $R_1\text{COONH}_2R_2R_3$ wherein $R_1$, $R_2$ and $R_3$ are selected from the group consisting of hydrogen, a straight, branched, substituted, unsubstituted, saturated and unsaturated $C_1$–$C_7$ alkyl group and mixtures thereof, by adding from 0.1 to about 5% water and sufficient amide derivative of the ionogen so that the concentrations of the amide and water are related to the concentration of the salt in accordance with the equation: $[\text{amide}][\text{H}_2\text{O}] = K[\text{salt}]^2$, wherein K is the equilibrium constant.

References Cited

UNITED STATES PATENTS

| | | | |
|---|---|---|---|
| 2,165,091 | 7/1939 | Clark | 317—230 |
| 2,749,487 | 6/1956 | Jenny et al. | 317—230 |

FOREIGN PATENTS

| | | |
|---|---|---|
| 3,138,746 | 6/1964 | Canada. |

JAMES D. KALLAM, *Primary Examiner.*